(12) United States Patent
Coviello et al.

(10) Patent No.: US 9,569,161 B2
(45) Date of Patent: Feb. 14, 2017

(54) REMOTE VISUALIZATION AND CONTROL FOR VIRTUAL MOBILE INFRASTRUCTURE

(71) Applicant: NEC Laboratories America, Inc., Princeton, NJ (US)

(72) Inventors: Giuseppe Coviello, Plainsboro, NJ (US); Murugan Sankaradass, Dayton, NJ (US); Srimat Chakradhar, Manalapan, NJ (US); Valentina Pelliccia, Afragola (IT)

(73) Assignee: NEC Corporation (JP)

( * ) Notice: Subject to any disclaimer, the term of this patent is extended or adjusted under 35 U.S.C. 154(b) by 424 days.

(21) Appl. No.: 14/150,741

(22) Filed: Jan. 8, 2014

(65) Prior Publication Data

US 2014/0289637 A1    Sep. 25, 2014

Related U.S. Application Data

(60) Provisional application No. 61/803,945, filed on Mar. 21, 2013.

(51) Int. Cl.
*G06F 3/0484* (2013.01)
*G06F 3/14* (2006.01)
*G06F 9/44* (2006.01)

(52) U.S. Cl.
CPC .......... *G06F 3/1415* (2013.01); *G06F 9/4445* (2013.01); *G09G 2358/00* (2013.01); *G09G 2370/022* (2013.01)

(58) Field of Classification Search
CPC .............. G06F 3/00; G06F 3/01; G06F 3/017; G06F 3/041; G06F 3/048; G06F 3/0481; G06F 3/0482; G06F 3/0484; G06F 3/0488; G06F 1/1626; G06F 8/38; G06F 9/4443; H04L 29/06; H04L 29/0809; H04L 29/08072
See application file for complete search history.

(56) References Cited

U.S. PATENT DOCUMENTS 9,160,796 B2 *   10/2015   Reeves ............... H04L 67/1095
9,219,813 B2 *   12/2015   Deasy ...................... C09J 7/041
2012/0127185 A1 *  5/2012   Chowdhry ............. G09G 5/393
                                                              345/531

* cited by examiner

*Primary Examiner* — Xiomar L Bautista
(74) *Attorney, Agent, or Firm* — Joseph Kolodka

(57) ABSTRACT

A method for running application software for a mobile device by virtualizing a mobile device operating system (OS); running a virtual instance of the mobile device OS with the application software on a server on the cloud; and rendering on the server and sending a display image for the mobile device screen to be displayed on the mobile device.

20 Claims, 5 Drawing Sheets

REMOTE VISUALIZATION AND CONTROL FOR VIRTUAL MOBILE INFRASTRUCTURE

This application is a utility conversion and claims priority to Provisional Application Ser. 61/803,945 filed Mar. 21, 2013, the content of which is incorporated by reference.

BACKGROUND

In recent years the market has adapted to the usefulness of cloud computing for the server (backend) and the desktop (frontend, de-velopment, end-user experience) computing. Cloud computing has a strong potential also for mobile computing. Today the gap between mobile computing and desktop computing in terms of usage, usefulness and security threats is very narrow. Mobile computing terminals (like smartphones or tablets) are used every day by millions of people for work, study and for entertain-ment purposes.

Current generation mobile devices are powerful enough to run complex applications, even though they are small and lightweight enough to be carried everyday anywhere in the pocket. Many smartphone owners use their devices for remote banking or as payment terminals, both for sending or receiving payments. Also many people use their mobile device for entertainment activities like, listening to the music, getting pictures or playing games.

Students use their tablets for reading textbooks and getting notes of classes; large and small busi-nesses distribute mobile devices to their employees. Each employee uses it differently, depending on his job function. For example, a carrier can use it to scan of the barcodes of the packages delivered. Many smartphone owners use their devices for remote banking or as payment terminals, both for sending or receiving payments. Also many people use their mobile device for entertainment activities like, listening to the music, getting pictures or playing games.

Based on above described usage scenarios by various categories of people under different usage contexts, there are many security threats while using mobile computing. Quite often a person uses the same de-vice for all the above described use cases, and hence the user runs various varieties of applications, whose category spans across work, study, entertainment. This introduces a big opportunity for malware that tries to steal business or personal information. Also since the mobile devices are small, expensive and powerful, they are stolen frequently. People quite often misplace or lose them. Losing a mobile device doesn't mean just losing an expensive object but the losing data stored in the device can hurt the person or company owns them. Also in general as popularity of mobile devices grows, users demand to run heavier applications on their mobile. As the trend indicates, us-age of desktop PCs decline, users want to run their desktop applications on their mobile devices with little or no modifications. These end user scenarios have requirements that are not possible using hardware resources available in mobile devices.

Cloud computing enables broad range of applications ranging from traditional office applications to 3D applications to the desktop. Even though mobile devices are increasingly becoming popular, they are not as powerful as desktop computers in terms of computing resources. Also end user demand to run heavier applications on mobile devices keeps increasing.

SUMMARY

In one aspect, a method for running application software for a mobile device by virtualizing a mobile device operating system (OS); running a virtual instance of the mobile device OS with the application software on a server on the cloud; and rendering on the server and sending a display image for the mobile device screen to be displayed on the mobile device.

Advantages of the preferred embodiments may include one or more of the following. The system reduces the risk of loss or theft of information by removing them from the mobile device and storing them securely in the cloud. Since it is efficient and scalable to computation locally where data is, computation is also moved onto the cloud. This is done by running the complete mobile operating system on the cloud. Running the complete OS on the cloud will mitigate the above dis-cussed security threats and satisfy application requirements:

- It will be possible to run very deep background scan on the full mobile operating system and applications periodically or con-tinuously with no loss of performances for the end user and without the risk of draining the battery of the device.
- Even if a device is lost or stolen no data will be lost or stolen; in fact the device will be a light, inexpensive viewer.
- Provide ability to run legacy desktop applications with high re-source requirements without any modifications.
- In addition to security, other benefits include:
- Cost effectiveness due to the usage of cloud computing, by consolidation and sharing of resources
- Development of mobile applications will be not limited by amount of memory or computing power of mobile devices.
- It will be possible to develop and run very complex applications with large computation needs. Traditional model of split computing architecture has overhead, in terms of communication, planning and development time.

BRIEF DESCRIPTION OF THE DRAWINGS

FIG. 3 shows an exemplary Android OS stack, while

DESCRIPTION

A Virtual Mobile Infrastructure (VMI) is disclosed that provides a collection of tools and frameworks for providing an end-to-end platform of public or private clouds where the running appliances are instances of a mobile operating system. The VMI architecture has some similarities to Virtual Desktop Infrastructure paradigm. Since there are differences between desktop computing and mobile computing, infrastructure has to be re-architected as desktop human interface is a screen-keyboard-mice system, the mobile human interface is a smaller touchscreen and possibly with only few buttons.

Figure 1:
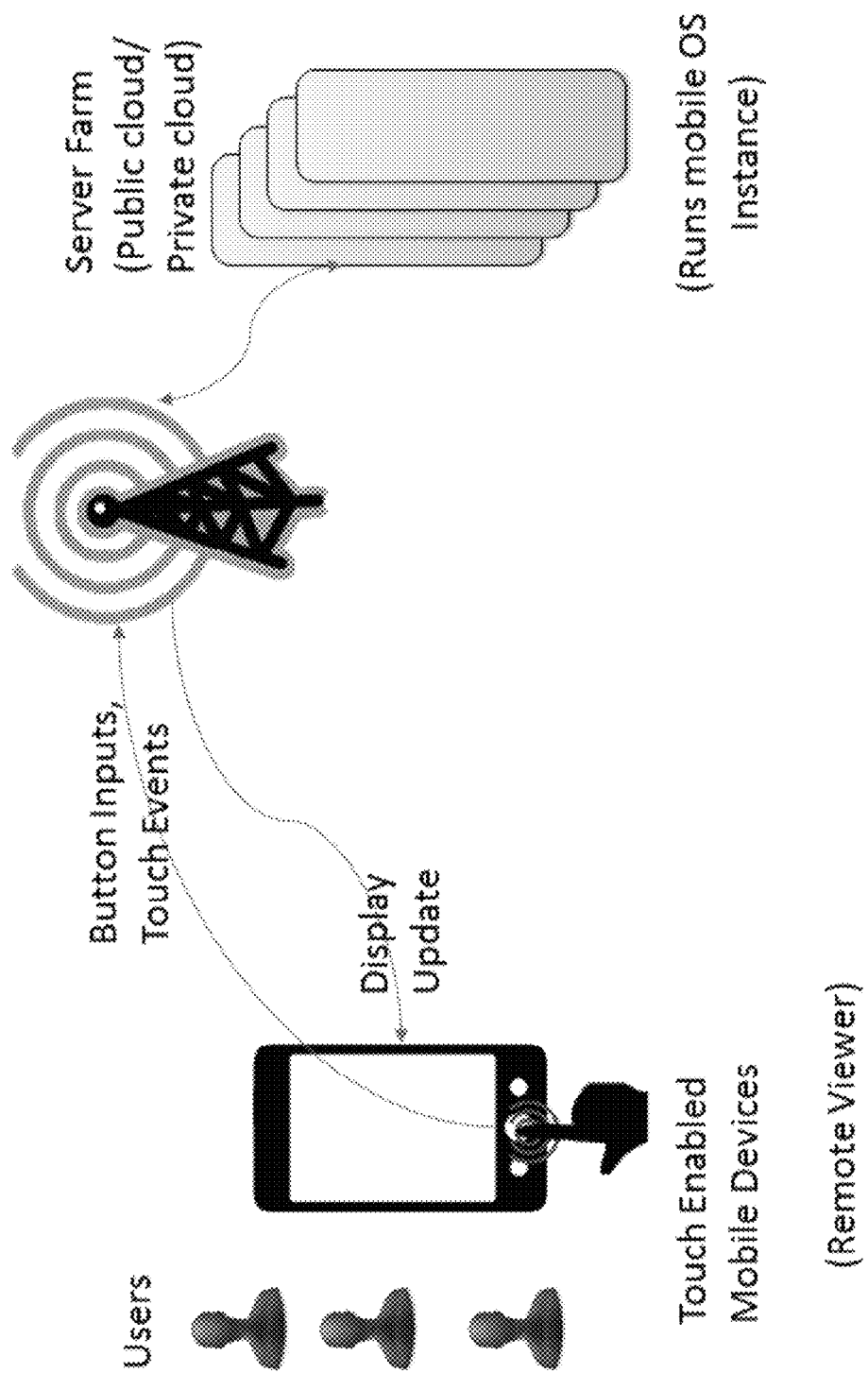
FIG. 1 shows an exemplary virtual mobile infrastructure running a protocol that enables the remote access and control of a mobile operating system using a touchscreen based viewer device.

FIG. 1 shows an exemplary virtual mobile infrastructure running a protocol that enables the remote access and control of a mobile operating system using a touchscreen based viewer device. Remote viewer architecture is similar to Virtual Network Computing (VNC) system; it consists of a Client-Server architecture, where the Client or "Viewer" is the physical device that has the control, while the Server has the virtual device to be controlled.

As shown in FIG. 1, the VMI architecture makes it possible viewing the screen of a remote mobile device and controlling it with the local touchscreen. By this way the user can interact directly on the "Viewer" as if she had actual device in her hands. The VMI Viewer as a VNC aims to give users access to centralized resources from simple, inexpensive devices. Whenever and wherever a VMI appliance is accessed, its state and configuration are exactly the same as when it was last accessed.

In one embodiment, the target mobile operating system used in our implementation is Android. However, the idea and the solutions presented in this document can be applied and extended to other mobile operating systems.

The basic function of VMI is to transmit screen (frame buffer) of virtual instance remotely running on the server to handheld viewer. Frame buffer is a memory buffer of the graphics adapter, which stores information for output, to represent an entire frame on the screen. Furthermore, it contains color information of each pixel on the screen. There is one to one mapping between the remote frame buffer (server) and the physical (client). Every time frame buffer is updated on the remote instance running on the server, it is sent to the client, which will instantly write on its frame buffer. This simultaneous visualization, allows us to gain control of the virtual device. Therefore the communication between client and server consists of the transfer of the frame buffer.

Figure 2:
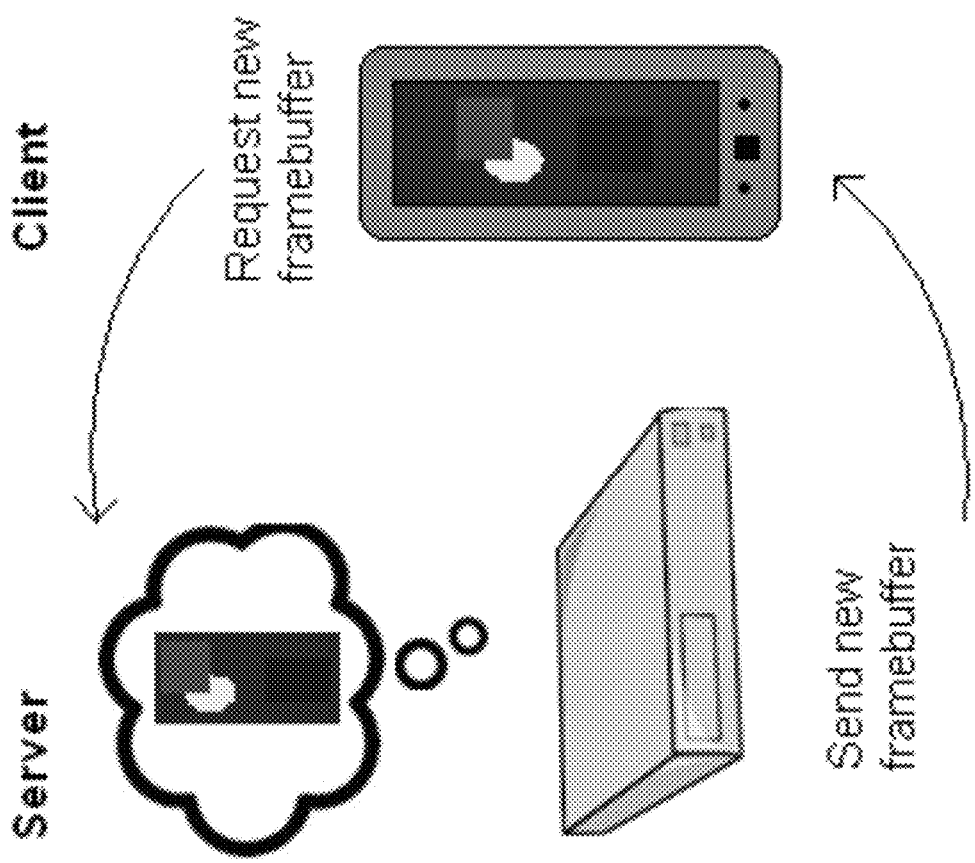
FIG. 2 shows an exemplary flow to keep the server and client frame buffers synchronized.

FIG. 2 shows an exemplary flow to keep the server and client frame buffers synchronized. Remote control is achieved through transmission of touch press events to the remote server instance. Almost all the modern mobile devices have touchscreens, which gives coordinates of the user press whenever user presses anywhere in the screen region. Also mobile phones have few input buttons. Both the screen press coordinates (x and y) and user button click events are transmitted to the remote server instance, corresponding to the local viewer. Based on the coordinates and button events, server instance can identify the command and execute it.

The communication protocol between the viewer and remote instance is as follows:

The client or viewer periodically requires a new frame buffer and sends a frame buffer request. It also forwards the commands generated by touch screen events or the pressure of the buttons to the remote server instance.

Every time that the remote server instance receives a request of the new frame buffer, it sends the updated frame buffer. When it receives the commands from the client, it executes them.

Generally every command received by the server produces a change of its frame buffer, which will be displayed by the viewer. The frame-buffer is sequentially sent from the server to the client, similar to the frame in a video. Since the frame buffer could change slower than the request coming from the client, sending an unchanged frame buffer may create unnecessary overhead. In order to avoid overhead, the server verifies whether there are any changes in the frame buffer before sending it to the client. An empty response is a coherent response, instructing the viewer to keep the current frame buffer contents. The server manages two different types of requests for remote visualization and control through sending of the new frame buffer and the running the commands.

The server in VMI context is the mobile operating instance running on the remote server cluster or cloud. From a high level point of view the server accomplishes to two jobs:

1. Forwarding the updated frame buffer to the client.
2. Replying to the events forwarded by the client by executing the commands in the local operating system.

Forwarding of Frame Buffer

Linux operating system on which Android is based, gives reading and writing functionality to the frame buffer through a special device, named/dev/fb0. Through this device, it is possible to obtain the copy of what is displayed on the screen or even change what is displayed on the screen reading and writing to that file.

Replay of Events

Android provides an ad-hoc service called "Monkey" for emulating user interaction, such as touch and button press events. So we use this service for replaying the user events on the operating system in the server side.

Server Life Cycle

There is one remote mobile OS virtual machine instance per remote viewer. The virtual machine (server) can be in running or sleep state depending upon the viewer's state. Whenever the viewer is active, server is activated and accepts new connection from the viewer. Before starting to exchange messages with the viewer, both the server and client must agree on the display-size and pixel format.

Since the device/dev/fb0 is memory mapped, it appears as a matrix having the same dimensions of the viewer's screen dimensions. The server keeps a copy of the frame buffer that is sent to the client.

Figure 3:
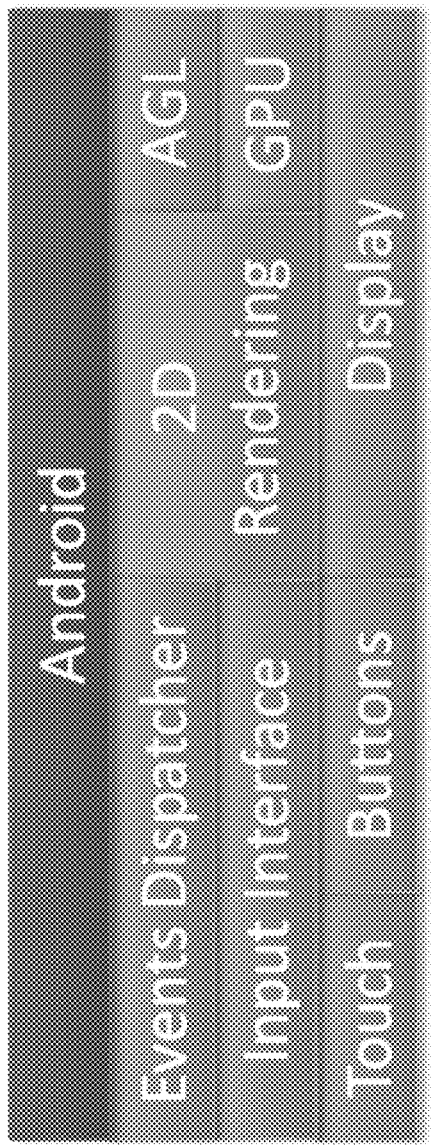
Figure 4:
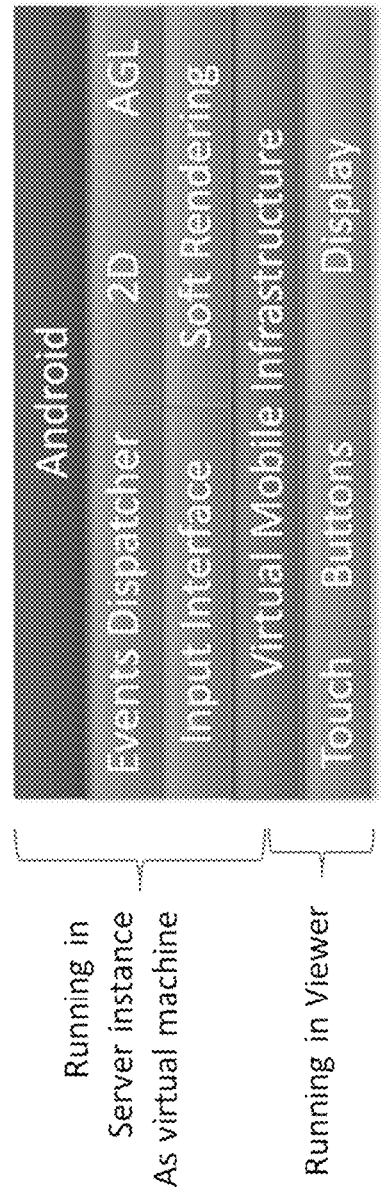
FIG. 4 shows the role of VMI in Mobile Cloud Computing.

FIG. 3 shows an exemplary Android OS stack, while FIG. 4 shows the role of VMI in Mobile Cloud Computing. There are two types of services running in the server to handle requests coming from the client:

The service dedicated to for frame-buffer communication, processes the request, checking if the frame buffer on the server is different from the one present on the client.

The service dedicated to execution of the commands generates responses to the user-events such as touches and presses. Success or failure is reported to the client.

Figure 5:
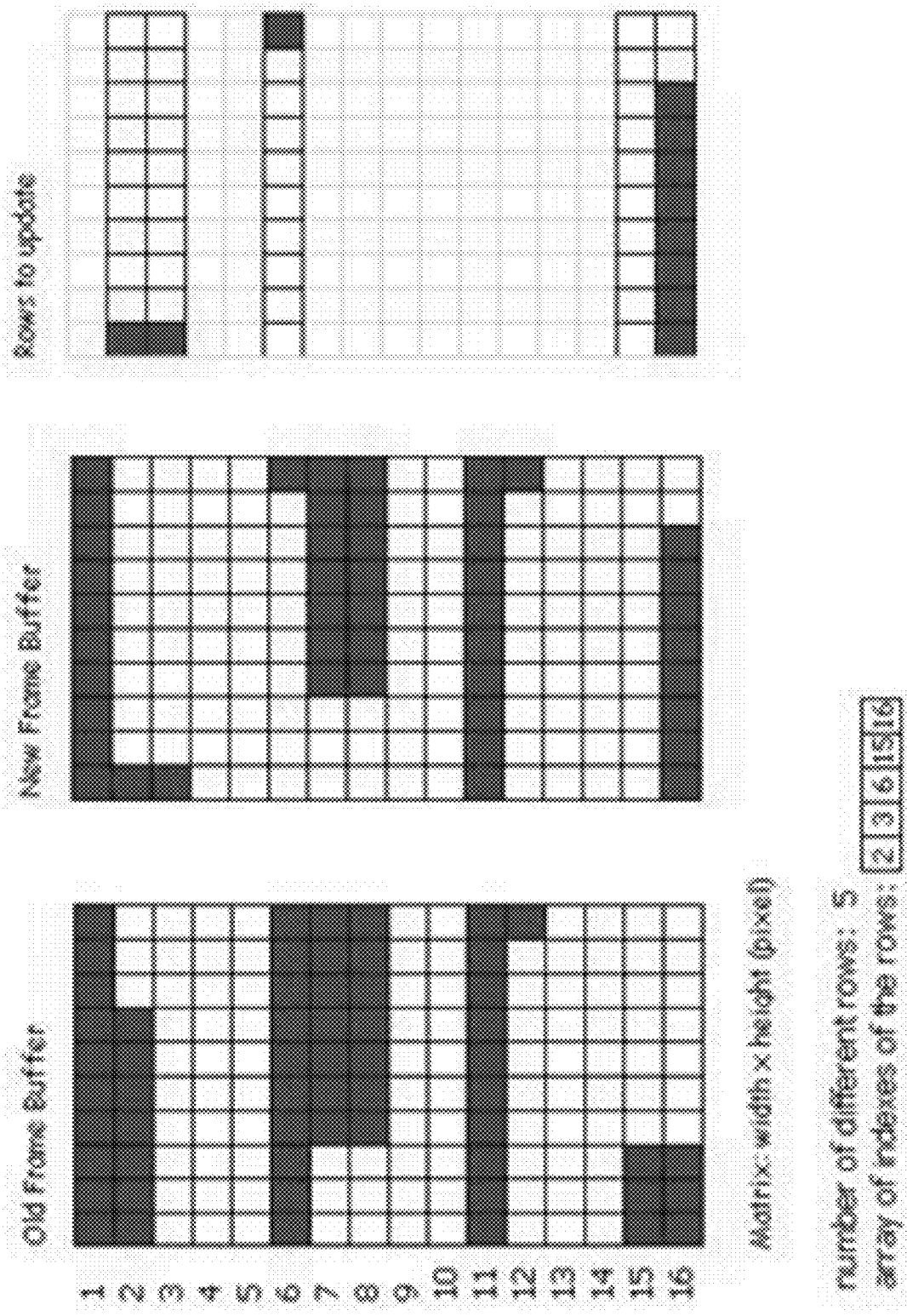
FIG. 5 shows an optimization of the frame buffer synchronization.

Next, optimization of screen updates is detailed. Quite often while using an application, just small areas of the screen are updated instead of the whole screen; for example while using a calculator, it is often updated just the bar displaying the dialed numbers. We have optimized the transfer of the frame buffer, by sending only the parts of the frame buffer changed from the previous synchronization. By this way, we have obtained a huge reduction of the transferred data. We obtain this optimization by scanning row by row the matrix previously sent to the client and comparing it with the actual frame buffer. If the number of the different rows is at least 1, the response sent to the client is composed of following information: the number of different rows, an array of indexes of the rows and the value of rows to update. FIG. 5 shows an optimization of the frame buffer synchronization. In a simple example of this process; the rows sent are five instead of the sixteen of the entire image.

The Client Application is discussed next. The client application runs on an ad-hoc device composed by a low power processor, a reasonable small amount of memory, a touchscreen and some physical buttons (three in the case of Android 2.x). The hardware runs a lightweight Linux based operating system and executes our client application at startup of the device. The client application is activated by events generated by the touchscreen, the buttons or a timer. When an event is captured, the application sends an appropriate request to the server.

In the case of an input event, touchscreen or button, it forwards the event to the server that will replicate the same event on the remote mobile operating system instance.

The timer based event is used for synchronizing the frame buffer. The server will immediately respond to timed request by communicating the changed parts since the latest synchronization. An empty reply is a legitimate response and it means that the frame buffer did not change. When there is an update to the frame buffer, the client will update the local frame buffer sent from server instance, using/dev/fb0 character device.

Based on above described usage scenarios by various categories of people under different usage contexts, there are many security threats while using mobile computing. Quite often a person uses the same device for all the above described use cases, and hence the user runs various varieties of applications, whose category spans across work, study, entertainment. This introduces a big opportunity for malware that tries to steal business or personal information.

Data compression techniques can be used to compress the frame buffer in the server side before sending it to clients. This will reduce the amount of mobile bandwidth required. Another possible optimization is the usage of interlace techniques, by which odd and even lines are refreshed in different framing intervals. This technique works reasonably well with videos, which is a common usage for mobile devices.

The current mobile devices are provided with numerous sensors like gyroscope and accelerometer for detection of movement. For the management of screen rotation, it is necessary to send values of these sensors of the physical device to the virtual device. Audio processing can also be handled.

By running the complete OS on the cloud, the system mitigates the security threats and satisfies a number of application requirements:
- It will be possible to run very deep background scan on the full mobile operating system and applications periodically or continuously with no loss of performances for the end user and without the risk of draining the battery of the device.
- Even if a device is lost or stolen no data will be lost or stolen; in fact the device will be a light, inexpensive viewer.
- Provide ability to run legacy desktop applications with high resource requirements without any modifications.
- Even though the security is the main problem that this invention tends to solve, it can give other benefits like:
- Cost effectiveness due to the usage of cloud computing, by consolidation and sharing of resources
- Development of mobile applications will be not limited by amount of memory or computing power of mobile devices.
- It will be possible to develop and run very complex applications with large computation needs. Traditional model of split computing architecture has overhead, in terms of communication, planning and development time.

We contemplate additional adaptation of VMI like architecture as follows:
- Device's battery life—Even though we eliminate computation on the viewer, it has to do lot of communication with the server to get frame buffers. This will affect battery lifetime. We can do certain optimizations in this topic to extend battery life.
- Wireless Bandwidth—This translates to cost for end-user. In case of corporate network over WiFi, there is no cost associated with this. But over cellular network, the cost might be a problem. Bandwidth usage can be reduced by encoding, compression techniques.
- Latency—Since every event processing and frame buffer refresh has to come from remote server, this can introduce latency. User might feel sluggish device. This can be improved by caching and duplicating server infrastructure.

Figure 6:
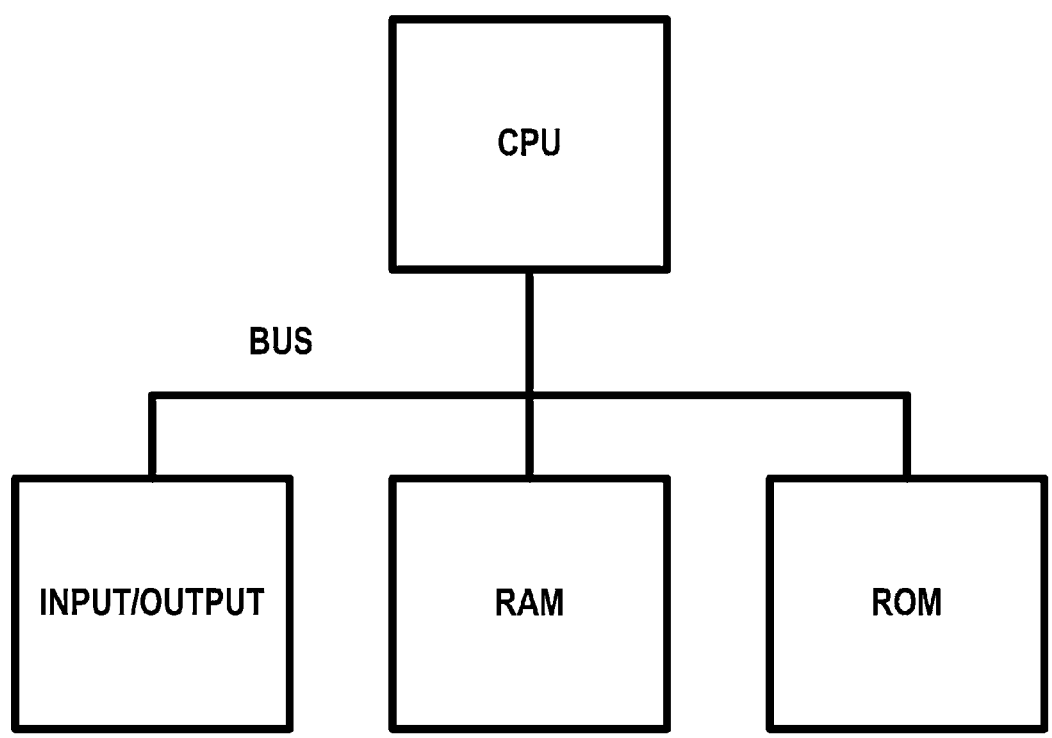
FIG. 6 shows an exemplary computer system that runs the process of FIGS. 2-5.

The system may be implemented in hardware, firmware or software, or a combination of the three. FIG. 6 shows an exemplary computer to execute the framework discussed above.

Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for running application software for a mobile device, comprising
virtualizing a mobile device operating system (OS);
running a virtual instance of the mobile device OS with the application software on a server on the cloud; and
rendering on the server and sending a display image for the mobile device screen to be displayed on the mobile device;
scanning row by row a matrix previously sent to the mobile device and comparing to an actual frame buffer and if a difference exists, sending to the mobile device the number of different rows, an array of indexes of the rows and the value of rows to update and otherwise sending an empty response to the mobile device to keep the current frame buffer contents and replying to events forwarded by the client by executing commands in a local operating system; and
when an event is captured, sending a request to the server and upon an input event, touchscreen or button, forwarding the event to the server to replicate the event on the virtual instance with a timer based event used for synchronizing the frame buffer and wherein the server responds to the timed event by communicating changed parts since the latest synchronization, and sending an empty reply to indicate the frame buffer has not changed.

2. The method of claim 1, wherein a frame-buffer is displayed on the mobile device, and the application software appears to be running locally on the mobile device.

3. The method of claim 1, comprising interacting with the displayed image by using a touch sensor.

4. The method of claim 1, comprising transmitting a touch command to the server on the cloud.

5. The method of claim 4, wherein the server in the cloud executes the touch command and re-sends a new frame-buffer to the mobile device.

6. The method of claim 1, comprising receiving an input event, touchscreen or button.

7. The method of claim 6, comprising forwarding the event to the server and handling the event on the mobile device OS instance.

8. The method of claim 1, comprising synchronizing a frame buffer with a timer based event, wherein the server responds to the timer-based event by communicating only changed data since the last synchronization.

9. A system, comprising:
a mobile device; and
a server on a cloud that runs a virtual instance of a mobile device operating system (OS) with an application software, wherein the server renders data intended for a mobile device and sending a display image for the mobile device screen for rendering on the mobile device and the server scanning row by row a matrix previously sent to the mobile device and comparing to an actual frame buffer and if a difference exists, sending to the mobile device the number of different rows, an array of indexes of the rows and the value of rows to update and otherwise sending an empty response to the mobile device to keep the current frame buffer contents and replying to the events forwarded by the client by executing the commands in the local operating system; and when an event is captured, sending a request to the server and upon an input event, touchscreen or button, forwarding the event to the server to replicate the event on the virtual instance with a timer based event used for synchronizing the frame buffer and wherein the server responds to the timed event by communicating changed parts since the latest synchronization, and sending an empty reply to indicate the frame buffer has not changed.

10. The system of claim 9, wherein a frame-buffer is displayed on the mobile device, and the application software appears to be running locally on the mobile device.

11. The system of claim 9, comprising code for interacting with the displayed image by using a touch sensor.

12. The system of claim 9, comprising code for transmitting a touch command to the server on the cloud.

13. The system of claim 12, wherein the server in the cloud executes the touch command and re-sends a new frame-buffer to the mobile device.

14. The system of claim 9, comprising code for receiving an input event, touchscreen or button.

15. The system of claim 14, comprising code for forwarding the event to the server and handling the event on the mobile device OS instance.

16. The system of claim 9, comprising code for synchronizing a frame buffer with a timer based event, wherein the server responds to the timer-based request by communicating only changed data since the last synchronization.

17. A method for running application software for a mobile device, comprising
virtualizing a mobile device operating system (OS); and
running the OS and a virtual instance of the mobile device with the application software on a server on the cloud; and
rendering a mobile device screen on the server and sending the mobile device screen for display on a frame-buffer of the mobile device so that a user thinks that the application is running locally on the mobile device;
scanning row by row a matrix previously sent to the mobile device and comparing to a actual frame buffer and if a difference exists, sending to the mobile device the number of different rows, an array of indexes of the rows and the value of rows to update and otherwise sending an empty response to the mobile device to keep the current frame buffer contents and replying to the events forwarded by the client by executing the commands in the local operating system; and
when an event is captured, sending a request to the server and upon an input event, touchscreen or button, forwarding the event to the server to replicate the event on the virtual instance with a timer based event used for synchronizing the frame buffer and wherein the server responds to the timed event by communicating changed parts since the latest synchronization, and sending an empty reply to indicate the frame buffer has not changed.

18. The method of claim 17, comprising transmitting a touch command to the server on the cloud.

19. The method of claim 17, wherein the server in the cloud executes the touch command and re-sends a new frame-buffer to the mobile device.

20. The method of claim 17, comprising receiving an input event, touchscreen or button and forwarding the event to the server and handling the event on the mobile device OS instance.

* * * * *